(No Model.)
F. EGNER.
PROCESS OF OBTAINING AMMONIA AND BONE BLACK.
No. 381,832. Patented Apr. 24, 1888.
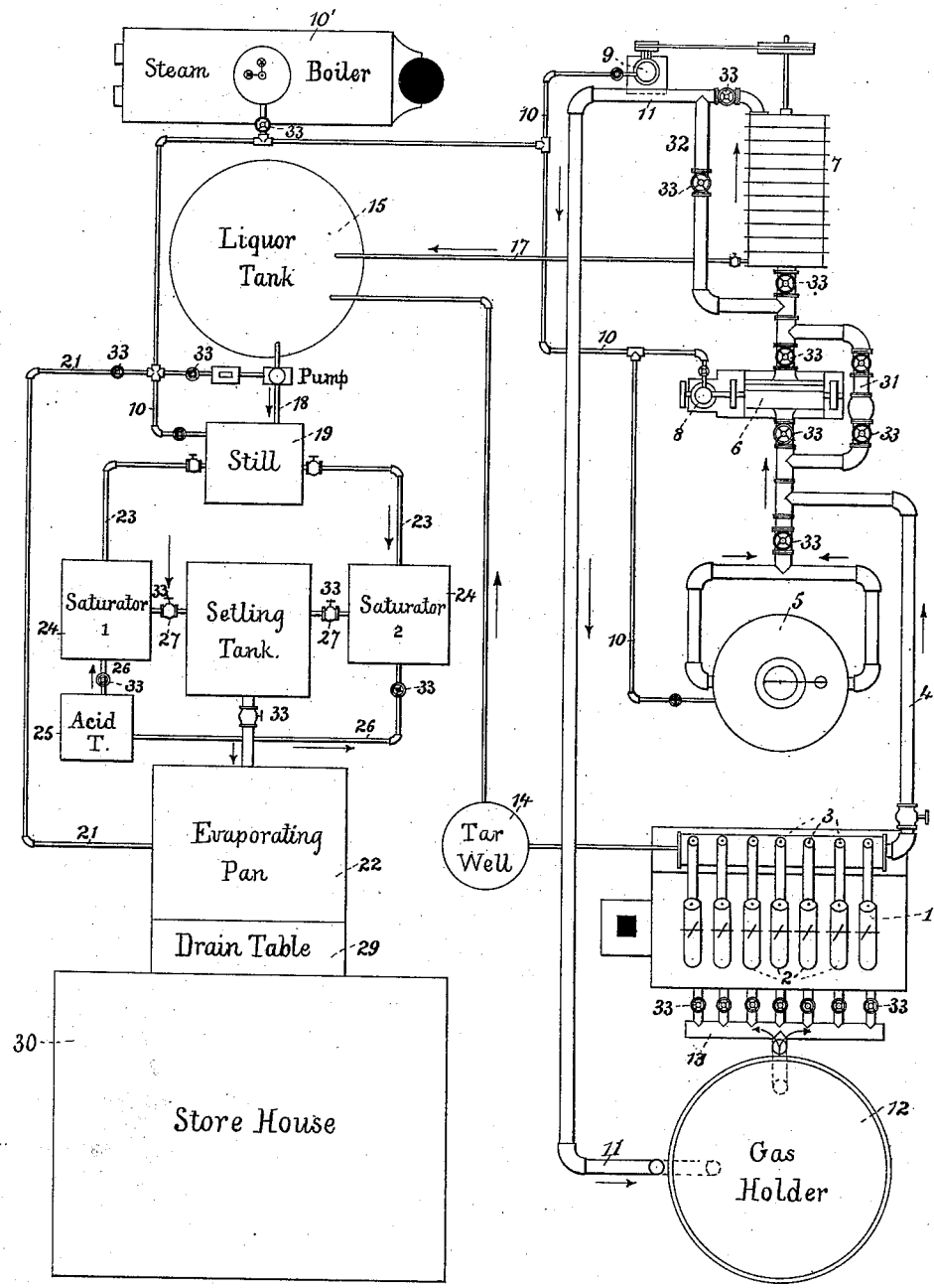

UNITED STATES PATENT OFFICE.

FREDERIC EGNER, OF ST. LOUIS, MISSOURI.

PROCESS OF OBTAINING AMMONIA AND BONE-BLACK.

SPECIFICATION forming part of Letters Patent No. 381,832, dated April 24, 1888.

Application filed June 2, 1887. Serial No. 240,107. (No model.)

*To all whom it may concern:*

Be it known that I, FREDERIC EGNER, of the city of St. Louis, in the State of Missouri, have invented a certain new and Improved Apparatus and Process for the Manufacture of Bone-Black; and I do hereby declare the following to be a full, clear, and exact description.

This apparatus and process is for saving the ammonia contained in the fuel which is used in the heating of the retorts containing the bones for carbonization, and also preserving any combustible gases which may escape from the bone-black retorts.

Heretofore animal charcoal has been made and the ammonia thereby resulting recovered about as follows: The bones, after being ground in a mill to a suitable size, were charged into retorts, heated externally by a fire similar to that employed for heating retorts for the manufacture of illuminating-gas. This might be a fire wherein the fuel was consumed directly, or wherein the same was converted into a gaseous fuel first, which was then consumed by allowing additional air to reach it; but in all cases the gases generated were allowed to escape to a chimney. In fact, such had to be done to have a fire or combustible gas at all. In any case the fuel accomplishes nothing excepting the heating of the retorts, whereas by using my invention the considerable ammonia which is set free is recovered from the fuel after being converted into combustible gas and before the latter is consumed in the furnaces to heat the retorts. The gas from the bones was, with or without the aid of an exhauster, conducted to saturators, the liquor afterward evaporated, and thus various ammoniacal salts produced. These salts usually were quite impure, contaminated with bone-tar and oils, and had to be treated to further purifying processes. The reason I give above brief description is to make more clear the nature of my improvements.

To more clearly illustrate my process and apparatus, I have made the accompanying drawing, which is a plan view of a complete bone-black and ammonia plant, except the bone-mill and driving-engine, and will now proceed to describe my invention, pointing out that which is new and that which is not new as I proceed, and will point out the advantages of my process.

1 is the kiln.

At 2 are shown the upper mouth-pieces of the retorts, in which the bone is carbonized, and from which the gas passes through the pipes indicated to the hydraulic main 3, and thence through the pipe 4. (Shown in the direction of the arrow.)

5 is a fuel-gas generator or producer. This producer is more clearly shown in Letters Patent No. 326,488, granted to me September 15, 1885, in which the specification, the manner, and principle of operating the same is also described. A producer analogous to this one might be used. I do not, however, confine myself to this particular producer.

6 is an exhauster. This may be a steam-jet, a rotary exhauster, or any other kind of exhauster.

7 is a scrubber, and the one shown in the drawing represents one of the variety known as the "Standard" washer-scrubber, which I prefer, though another may be used—for instance, a so-called "Tower" scrubber. Scrubbers may have been used before in connection with bone-black and ammonia works, though I believe not.

At some point between the gas-generator 5 and exhauster 6 a condenser ought to be placed; but this is not essential. An air or multitubular condenser of well-known design may be used.

8 and 9 are engines driving the exhauster and the scrubber, respectively.

At 10 are steam-pipes leading from the steam-boiler 10' to the engines 8 and 9 and the still 19. From the scrubber a pipe, 11, leads to the gas-holder 12, the gases passing in the direction of the arrows, and arrows also indicate the direction of the flow of the liquids in the further steps of the process, which, however, form no part of my invention and are only shown to clearly illustrate the connection of the whole. From the gas-holder the gas passes through distributing-pipes 13 and branch pipes to burners beneath the retorts in the furnace 1.

14 is a tar-well, receiving the overflow from the hydraulic main 3.

15 is a liquor-tank, receiving the overflow from the tar-well and the scrubber 7 through the pipes 16 and 17, respectively.

18 is a pump by which the contents of the liquor-tank is pumped into the still 19 through a pipe, 20, or through a pipe, 21, to the evaporating-pan 22. The product of distillation goes through pipes 23 to the saturators 24, that may contain sulphuric acid.

25 is a supply-tank containing the acid, and in communication with the saturators by pipes 26 and with a settling-tank by pipes 27.

28 is a pipe leading from the settling-tank to the evaporating-pan, and 30 a store-house.

31 and 32 are pipes by which the gases may be switched around the exhauster and scrubber, respectively. The pipes are furnished with all needed valves, 33.

The method of operating this apparatus and carrying out the process is as follows: A fire is kindled in the producer 5, and the fuel fed into it to a depth of three or four feet. Then the exhauster 6 is started, the valve on the hydraulic main of the kiln being closed. Fuel-gas is thus produced, which, if bituminous coal is employed, is rich in ammonia. This gas is sent on through the scrubber, passing first through a condenser, if a condenser is used. A small stream of water is run constantly, and then the ammonia of the fuel-gas is absorbed by the water. The ammonia-liquor makes its way to the liquor-tank, and is afterward distilled and treated in a well-known manner. The gas is turned into the gas-holder, and as soon as a sufficient quantity of fuel-gas has been made, which will be an hour or so after the fires in the producer have been started, the fires in the kiln may be lighted. When the retorts are hot enough, they are charged with the bones, and the valve on the hydraulic main is opened more or less. The gas produced is removed by the exhauster, which at the same time is removing the fuel-gas from the producer 2. Both gases—that from the bone and that from the fuel—pass together through a condenser, (if such should be employed, which is not absolutely necessary,) then through the scrubber, where the ammonia is removed from the gas. The gas then passes on to the holder, from which it is conducted into the furnace of the kiln to heat the retorts, as previously mentioned. Some of this gas may also be carbureted to light the factory by any well-known and simple carburetor. The tar produced is allowed to run into a tank, from which from time to time the ammoniacal liquors separating may be run into the liquor-tank, from which the liquor is pumped into a still, the ammonia driven off into the saturators, which are charged generally with sulphuric acid. Then, in due time, the saturated liquor is run into settling-tanks, an evaporating-pan, and then, after the salt has been formed and removed, the liquor may be used for other well-known purposes. These latter steps in the manufacture of ammonia salts are well known.

As I have stated, kilns for making bone-black have been formed in various ways; but never to my knowledge has a gas-producer been connected with the kiln in such a way as herein shown, when the fuel is first thoroughly converted into combustible gas, and the ammonia from the fuel-gas recovered, before the gas is burned to heat the retorts. The various portions of the apparatus—such as gas-holder, kiln, producer, exhauster, (condenser, if any is used,) Standard or other scrubber, together with the ammonia plant—have no doubt all been used for other purposes, but never together, as herein shown, and certainly not so that the ammonia from the fuel also was utilized together with the ammonia from the bone.

What I claim, therefore, as my invention, and desire to secure by Letters Patent, is—

1. The described process of producing bone-black and ammonia by mixing the gaseous products of the carbonization of the bone-black with combustible gas from a gas-producer, and passing them through a device for the removal of ammonia.

2. The described process of producing bone-black and ammonia by mixing the gaseous products of the carbonization of the bone-black with gas from a gas-producer, passing them through a device for the removal of ammonia, and then to burners beneath the retorts of carbonizing-furnace.

FREDERIC EGNER.

Witnesses:
JNO. A. TOMPKINS,
JNO. M. SKAHILL.